US008774106B2

(12) United States Patent  
Löhr et al.

(10) Patent No.: US 8,774,106 B2  
(45) Date of Patent: Jul. 8, 2014

(54) OVERHEAD REDUCTION OF UPLINK CONTROL SIGNALING IN A MOBILE COMMUNICATION SYSTEM

(75) Inventors: Joachim Löhr, Langen (DE); Eiko Seidell, Langen (DE)

(73) Assignee: Panasonic Corporation, Osaka (JP)

( * ) Notice: Subject to any disclaimer, the term of this patent is extended or adjusted under 35 U.S.C. 154(b) by 1263 days.

(21) Appl. No.: 12/281,759

(22) PCT Filed: Jan. 26, 2007

(86) PCT No.: PCT/EP2007/000705  
§ 371 (c)(1),  
(2), (4) Date: Dec. 1, 2008

(87) PCT Pub. No.: WO2007/101510  
PCT Pub. Date: Sep. 13, 2007

(65) Prior Publication Data  
US 2009/0097444 A1    Apr. 16, 2009

(30) Foreign Application Priority Data

Mar. 7, 2006  (EP) .................................. 06004664

(51) Int. Cl.  
*H04W 72/04*   (2009.01)

(52) U.S. Cl.  
USPC ........................................................ 370/329

(58) Field of Classification Search  
USPC .......................................... 370/319, 329, 344  
See application file for complete search history.

(56) References Cited

U.S. PATENT DOCUMENTS

| 6,487,183 | B1 * | 11/2002 | Lo et al. ........................ 370/326 |
| 7,508,842 | B2 * | 3/2009 | Baum et al. ................... 370/468 |
| 7,596,122 | B2 * | 9/2009 | Han et al. ...................... 370/332 |
| 7,792,079 | B2 * | 9/2010 | Choi et al. ..................... 370/331 |
| 7,916,751 | B2 * | 3/2011 | Reznik et al. ................. 370/469 |
| 2003/0064728 | A1 * | 4/2003 | Speight ........................ 455/450 |

(Continued)

FOREIGN PATENT DOCUMENTS

| CN | 1455607 | 11/2003 |
| CN | 1701537 | 11/2005 |

(Continued)

OTHER PUBLICATIONS

Chinese Office Action dated Oct. 13, 2010.

(Continued)

*Primary Examiner* — Mohammad Anwar  
(74) *Attorney, Agent, or Firm* — Dickinson Wright PLLC

(57) ABSTRACT

The present invention relates to a method and mobile terminal for transmitting data on uplink within a mobile communication system. Further the invention relates to a network entity for allocating uplink resources to such a mobile terminal. When a user equipment is transmitting uplink (UL) data according to allocated resources, it has to indicate the transport format of the current data transmission to Node B by means of UL control signaling. To propose a scheduling scheme which reduces the overhead of uplink control signaling, a method is proposed that achieves a significant reduction of the UL control signaling overhead by considering characteristics of an orthogonal radio access scheme used for evolved UTRA uplink scheme and using differential signaling of the transport format information. Although the invention is particularly suitable for uplink transmissions in an orthogonal single-carrier radio access scheme, it is not restricted to this particular embodiment.

22 Claims, 4 Drawing Sheets

(56) References Cited

U.S. PATENT DOCUMENTS

| | | | |
|---|---|---|---|
| 2003/0232622 | A1 | 12/2003 | Seo |
| 2004/0185892 | A1* | 9/2004 | Iacono et al. ............... 455/522 |
| 2004/0233899 | A1 | 11/2004 | Vayanos |
| 2005/0073985 | A1* | 4/2005 | Heo et al. ................... 370/342 |
| 2005/0163056 | A1 | 7/2005 | Ranta-Aho |
| 2006/0003787 | A1* | 1/2006 | Heo et al. ................... 455/522 |
| 2006/0111119 | A1 | 5/2006 | Iochi |
| 2006/0234741 | A1* | 10/2006 | Provvedi .................... 455/513 |

FOREIGN PATENT DOCUMENTS

| | | |
|---|---|---|
| CN | 1716837 | 1/2006 |
| CN | 1742509 | 3/2006 |
| WO | 2004/068886 | 8/2004 |

OTHER PUBLICATIONS

International Search Report dated Mar. 14, 2007.
F. Klein, et al., "Reduction of Signaling Overhead in Beyond 3G MAC-Protocols using Frame Descriptor Tables," Proceedings of 11th European Wireless Conference 2005, Nicosia, Cyprus, vol. 1, Apr. 2005, pp. 260-265.
J. Lee, et al., "A rate control algorithm for uplink high-speed packet data transmission in UMTS," Signal Processing Advances in Wireless Communications, 2005 IEEE 6th Workshop on New York, NY, USA Jun. 2-8, 2005, Piscataway, NJ, USA, IEEE, Jun. 2, 2005, pp. 730-734.
G. Sharma, et al., "Moving towards HSUPA (high speed uplink packet access): a complete 3.5 G wireless system," Personal Wireless Communications, 2005. ICPWC 2005. 2005 IEEE International Conference on New Delhi, India Jan. 23-25, 2005, Piscataway,NJ, USA, IEEE, Jan. 23, 2005, pp. 174-177.
J. Peisa et al., "End-to-End Performance of WCDMA Enhanced Uplink," Vehicular Technology Conference, 2005. VTC 2005-Spring. 2005 IEEE 61st Stockholm, Sweden May 1-30, 2005, Piscataway, NJ, USA, IEEE, May 30, 2005, pp. 1432-1436.
3GPP TS 25.309 version 6.3.0 Release 6); ETSI TS 125 309, Universal Mobile Telecommunications System (UMTS); FDD enhanced uplink; Overall description; Stage 2 (ETSI Standards, European Telecommunications Standards Institute, Sophia-Antipo, FR, vol. 3-R2, No. V630, Jun. 2005.
3GPP TSG-RAN WG1 Meeting #43, "Uplink scheduling procedure," Samsung, Tdoc R1-051347, Nov. 7-11, 2005, pp. 1-4.
3GPP RAN WG1 Meeting #44, "Uplink Scheduling," Samsung, R1-060353, Feb. 13-17, 2006, pp. 1-7.
Chinese Office Action dated Nov. 29, 2013 with English translation.

* cited by examiner

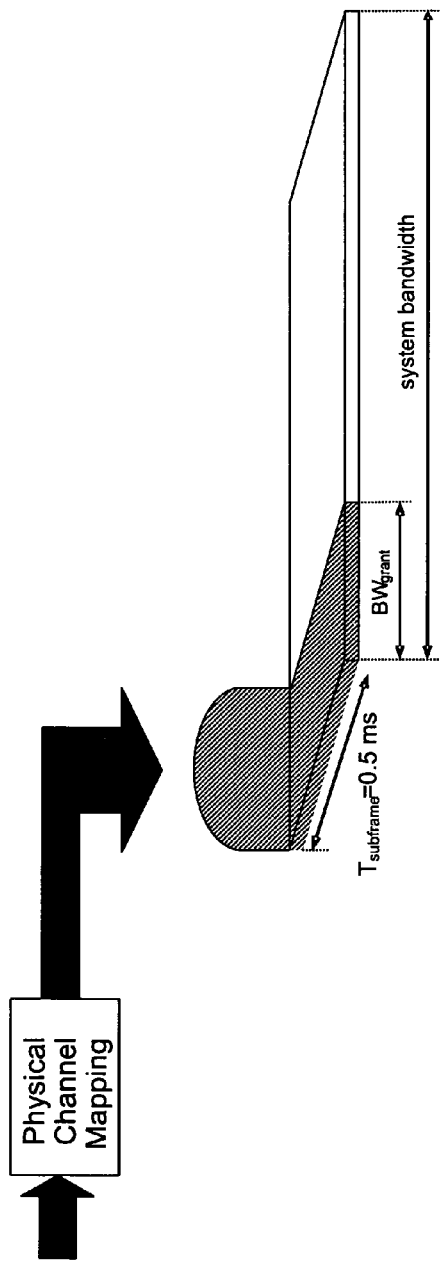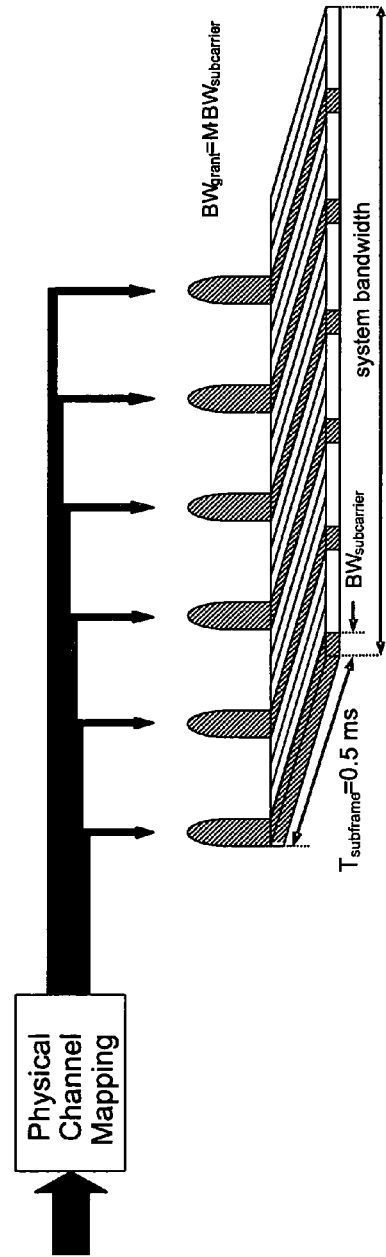

OVERHEAD REDUCTION OF UPLINK CONTROL SIGNALING IN A MOBILE COMMUNICATION SYSTEM

FIELD OF THE INVENTION

The present invention relates to a method and a mobile terminal for transmitting data on uplink within a mobile communication system. Further, the invention relates to a network entity for allocating uplink resources to a mobile terminal.

TECHNICAL BACKGROUND

A common technique for error detection and correction in packet transmission systems over unreliable channels is called Hybrid Automatic Repeat Request (HARQ). Hybrid ARQ is a combination of Forward Error Correction (FEC) and ARQ.

If an FEC encoded packet is transmitted and the receiver fails to decode the packet correctly, wherein errors are usually checked by a Cyclic Redundancy Check (CRC), the receiver requests a retransmission of the packet. Generally, and throughout this document, the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed of, and depending on how the receiver processes the information, the following hybrid ARQ schemes are defined:

Type I: If the receiver fails to decode a packet correctly, the information of the encoded packet is discarded and a retransmission is requested. This implies that all transmissions are decoded separately. Generally, retransmissions contain identical information (code-bits/symbols) to the initial transmission.

Type II: If the receiver fails to decode a packet correctly, a retransmission is requested, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission, the receiver combines the stored information from the soft-buffer and the currently received information and tries to decode the packet based on the combined information. The receiver can also try to decode the transmission individually, however, generally performance increases when combining transmissions. The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining, wherein LLR combining only works for code-bits.

Type II schemes are more sophisticated than Type I schemes, since the probability for correct reception of a packet increases with receive retransmissions. This increase comes at the cost of a required hybrid ARQ soft-buffer at the receiver. This scheme can be used to perform dynamic link adaptation by controlling the amount of information to be retransmitted. E.g. if the receiver detects that decoding has been "almost" successful, it can request only a small piece of information for the next retransmission, that is, a smaller number of code-bits/symbols than in previous transmission, to be transmitted. In this case it might happen that it is even theoretically not possible to decode the packet correctly by only considering this retransmission by itself (non-self-decodable retransmissions).

Type III: This is a subset of Type II with the restriction that each transmission must be self-decodable.

A new feature, the so called FDD Enhanced Uplink Dedicated Channel (E-DCH), which is also referred to as High Speed Uplink Packet Access (HSUPA), was introduced in 3GPP Release 6 ($3^{rd}$ Generation Partnership Project; available at http://www.3gpp.org) with the goal to improve uplink data transmission by reducing delays, increasing uplink capacity as well as uplink coverage particularly for packet data services.

Due to the rapid growth of IP-based applications there is a need for the design of a high-speed wireless data packet communication system. E-DCH aims at improving the performance of dedicated uplink (UL) transport channels. Several new techniques have been introduced in order to meet the requirements for E-DCH, as for instance is described in the Technical Specification 3GPP TSG RAN WG2 TS25.309, FDD Enhanced Uplink; Overall Description; Stage 2 (Release 6) V.6.3.0:

Node B controlled scheduling
fast HARQ protocol
shorter Transmission Time Interval (TTI)

Node B controlled scheduling allows for a fast allocation of resources among users in the cell, which results in a better control of the uplink interference. This in turn improves the uplink coverage and cell throughput. The introduction of an HARQ protocol allows for rapid retransmissions of erroneously received data packets, thereby reducing delays caused by higher layer retransmissions. The introduction of a shorter Transmission Time Interval (TTI) allows for a further significant reduction of the overall delay and hence improves the quality of service experienced by the end user, as this is described in: Janne Peisa, Hannes Ekström, Hans Hannu, Stefan Parkvall, End-to-End Performance of WCDMA Enhanced Uplink, VTC Spring 2005, Stockholm, Sweden.

Node B controlled scheduling is one of the technical features for E-DCH which is foreseen to enable more efficient use of the uplink resource in order to provide a higher cell throughput in the uplink and to increase the coverage. The term "Node B controlled scheduling" denotes the possibility for the Node B to control, within the limits set by the RNC, the uplink resource, E-DPDCH/DPCCH power ratio, which a User Equipment (UE) may use for uplink transmissions on the E-DCH. The Node B controlled scheduling is based on uplink and downlink control signaling together with a set of rules on how the UE shall behave with respect to this signaling.

In the downlink, a resource indication, the so called Scheduling Grant, is required to indicate to the UE the maximum amount of uplink resources it may use. When issuing Scheduling Grants, the Node B may use Quality of Service (QoS)-related information provided by the Serving Radio Network Controller (SRNC) and from the UE in the Scheduling Requests.

Scheduling grants are signaled in the downlink in order to indicate the maximum resource the UE may use for uplink transmissions. The grants affect only the selection of a suitable transport format for the transmission on the E-DCH (E-TFC selection), they do not influence the TFC selection for legacy DCH channels.

There are two types of scheduling grants which are used for the Node B controlled scheduling: absolute grants and relative grants.

The absolute grants provide an absolute limitation of the maximum amount of UL resources the UE may use for uplink transmissions; they are used to rapidly change the allocated UL resources. Relative grants are transmitted every TTI. They are used to adapt the allocated UL resource, indicated by absolute grants, by smaller adjustments. The relative grant indicates the UE to increase or decrease the previously allowed maximum UL resource by one step.

Absolute grants are only signaled from the E-DCH serving cell. Relative grants can be signaled from the serving cell as well as from a non-serving cell. The E-DCH serving cell denotes the entity, which actively allocates UL resources to UEs controlled by this serving cell, whereas a non-serving cell can only limit the allocated UL resources, set by the serving cell. Each UE has only one serving cell.

Absolute grants contain the identity (E-RNTI) of the UE (or group of UEs) for which the grant is intended, the maximum power ratio the UE is allowed to use, and a flag which indicates whether the absolute grant is valid for only one HARQ process or for all HARQ processes. As already mentioned, absolute grants can be valid for a single UE, which is referred to in the following as dedicated grants, or for a group (all) of UEs, which is in the following referred to as common grant. Up to two identities (E-RNTI), a primary and a secondary, can be allocated to a UE at a time.

Relative grants can be sent, as already mentioned before, from a serving cell as well as from a non-serving cell.

A relative grant signaled from the serving cell could indicate one of the three values "UP", "HOLD" and "DOWN". "UP" respectively "DOWN" indicates the increase/decrease of the previously maximum used UL resource (maximum power ratio) by one step. Relative grants from a non-serving cell can either signal a "HOLD" or "DOWN" command to the UE. As mentioned before, relative grants from non serving cells can only limit the UE allowed UL resources set by the serving cell (overload indicator), but not increase.

In order to enable Node B to make an efficient scheduling, which considers also the QoS requirements of a service mapped on the E-DCH, UE provides the Node B with information by means of rate request signaling.

There are two kinds of rate request signaling in the uplink, the so called "happy bit", which is a rate-request related flag on the E-DPCCH and the scheduling information (SI), which is sent in-band on the E-DCH.

From a system point of view, the one-bit rate request is likely to be used by the serving cell to make small adjustments in the resource allocation, for example by using relative grants. Scheduling information is instead likely to be used in making longer term scheduling decisions, which would be reflected in the transmission of an absolute grant. Details on the two rate request signaling methods are provided in the following.

As mentioned before, the scheduling information should provide Node B information on the UE status in order to allow for an efficient scheduling. The SI is included in the MAC-e PDU. The information is sent periodically to Node B in order to allow for keeping track of the UE status. The scheduling information comprises following information fields:

Logical channel ID of the highest priority data in the scheduling information

UE buffer occupancy (in Bytes):

Informs about the buffer status for the highest priority logical channel with data in buffer and the total buffer status.

Power status information:

The power status indicates the ratio of the maximum UE transmission power and the corresponding DPCCH code power.

Identifying the logical channel by the logical channel ID from which the highest priority data originates would enable the Node B to determine the QoS requirements, e.g. power offset of the corresponding MAC-d flow, logical channel priority or GBR attribute, of this particular channel. This would in turn enable the Node to determine the grant needed to transmit the data in the UE buffer, making a more precise grant allocation possible. In addition to the highest priority data buffer status, it is beneficial for the Node B to have some information on the total buffer status. This would help in making more long-term resource allocation decisions.

In order for the serving Node B to be able to allocate uplink resources effectively, it needs to know up to what power each UE is able to support. This information could be conveyed in the form of a "power headroom" measurement, indicating how much power the UE has left over on top of that used for the DPCCH. The power status report could also be used for the triggering of a TTI reconfiguration, switching between 2 ms and 10 ms TTI and vice versa. As already mentioned before Scheduling information is sent from the UE in order to allow Node B to send a Serving Grant. In the case where the UE has no Serving Grant available and it has scheduled data to send on a logical channel the UE shall send Scheduling Information to the Node B in order to request for a Serving Grant. In case UE has a already a Serving Grant, it should send Scheduling Information to the Node B periodically in order to keep Node B up-to-date of its data/power status. This enables Node B to update the Serving Grant accordingly.

As already explained above the happy bit denotes a one-bit rate request related flag, which is sent on the E-DPCCH. The "happy bit" indicates whether it is happy or unhappy with the current Serving Grant (SG).

The UE shall indicate that it is "unhappy", if all the following criteria are met:

UE is transmitting as much scheduled data as allowed by the current Serving Grant; and UE has Power available to send at higher data rates (E-TFCs) and Total buffer status would require more than X TTIs with the current Grants (where X is configurable).

Otherwise, the UE shall indicate that it is "happy".

There are two types of data transmissions for Enhanced Uplink, scheduled and non-scheduled transmissions. For scheduled data transmissions UE needs a valid scheduling grant before transmitting data on E-DCH. The usual procedure implies that UE sends a rate request to the serving Node B, by means of either scheduling information or happy bit, and upon reception of the rate request, serving Node B will allocate uplink resources by means of scheduling grants, i.e. absolute and relative grants, to the UE. In case of non-scheduled data transmission, the UE is allowed to send E-DCH data at any time, up to a configured number of bits, without receiving any scheduling command from the Node B. Thus, signaling overhead and scheduling delay are minimized. The resource for non-scheduled transmission is given by the SRNC in terms of a maximum number of bits that can be included in a MAC-e PDU, and is called non-scheduled grant. A non-scheduled grant is defined per MAC-d flow. Logical channels mapped on a non-scheduled MAC-d flow can only transmit up to the non-scheduled grant configured for that MAC-d flow. The Node B is informed about non-scheduled grants via Node B Application Part (NBAP) signaling, the UE via Radio Resource Control (RRC) signaling. There is a set of rules defining the handling of non-scheduled and scheduled data flows, which will be explained in detail in the following.

The UMTS Terrestrial Radio Access Network (UTRAN) can restrict a non-scheduled MAC-d flow to use only a limited number of HARQ processes in case of 2 ms TTI. For non-scheduled grants Node B has always to reserve the configured resources, i.e. maximum number of bits. In order to limit the amount of resources Node B has to reserve permanently, which might be fairly significant especially for the 2 ms TTI case, UTRAN (SRNC) can disable certain HARQ processes for non-scheduled MAC-d flows. The allocation of HARQ processes for non-scheduled MAC-d flows is configured via RRC signaling. The corresponding signaling is shown in the following Table 1 [from Technical Specification 3GPP TS 25.331 V6.8.0 (2005-12)].

be served in the order of their priorities until the non-scheduled grants and scheduled grants are exhausted, or the maximum transmit power is reached.

In parallel to the Enhanced Dedicated Physical Data Channel (E-DPDCH) used to carry the E-DCH transport channel (data bits), the Enhanced Dedicated Physical Control Channel (E-DPCCH) is always transmitted simultaneously. E-DPCCH is a physical channel used to transmit control information associated with the E-DCH.

The information fields on the E-DPCCH are:
  Retransmission Sequence Number (RSN) [2 bit]
  "Happy Bit" [1 bit]
  Enhanced Transport Format Combination Identifier (E-TFCI) [7 bit]

TABLE 1

MAC-d flow information in TS25.331 for HSUPA

| Information Element/Group name | Need | Type and reference | Semantics description |
|---|---|---|---|
| E-DCH MAC-d flow identity | Mandatory Present | E-DCH MAC-d flow identity 10.3.5.7e | |
| E-DCH MAC-d flow power offset | Optional | Integer (0 . . . 6) | Only allowed to be absent when already defined for this E-DCH MAC-d flow; unit is dB. |
| E-DCH MAC-d flow maximum number of retransmissions | Optional | Integer (0 . . . 15) | Only allowed to be absent when already defined for this E-DCH MAC-d flow |
| E-DCH MAC-d flow multiplexing list | Optional | Bitstring (maxE-DCHMACdFlow) | Indicates, if this is the first MAC-d flow for which PDU's are placed in the MAC-e PDU, the other MAC-d flows from which MAC-d PDU's are allowed to be included in the same MAC-e PDU. Bit 0 is for MAC-d flow 0, Bit 1 for MAC-d flow 1, . . . Value '1' for a bit means multiplexing is allowed. |
| CHOICE transmission grant type | Optional | | Only allowed to be absent when already defined for this E-DCH MAC-d flow |
| >Non-scheduled transmission grant info | | | |
| >>Max MAC-e PDU contents size | Mandatory Present | Integer (1 . . . 19982) | |
| >>2 ms non-scheduled transmission grant HARQ process allocation | Mandatory Default | Bitstring (8) | MAC-d PDU's for this MAC-d flow are only allowed to be transmitted in those processes for which the bit is set to "1". Bit 0 corresponds to HARQ process 0, bit 1 corresponds to HARQ process 1, . . . Default value is: transmission in all HARQ processes is allowed. |
| >Scheduled transmission grant info | | NULL | |

Further, UTRAN can reserve some HARQ processes for non-scheduled transmission (i.e. scheduled data cannot be sent using these processes, they are considered disabled) in case of 2 ms TTI.

Moreover, multiple non-scheduled MAC-d flows may be configured in parallel by the SRNC. The UE is then allowed to transmit non-scheduled transmissions up to the sum of the non-scheduled grant if multiplexed in the same TTI.

Scheduled grants will be considered on top of non-scheduled transmissions.

Finally, logical channels mapped on a non-scheduled MAC-d flow cannot transmit data using a Scheduling Grant As can be seen from the rules defined above, the resource allocation from UTRAN side is separated between scheduled and non-scheduled grants. Also within the UE the allocation of resources to logical channels is done in accordance to scheduled and non-scheduled grants. Logical channels will The RSN field provides some HARQ related information like redundancy version and New Data Indicator. The Happy Bit is a one-bit rate request flag, as already mentioned above. The E-TFCI field indicates the data rate (coding format) used for the current transmission on E-DPDCH.

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G. The 3GPP recently launched a Study Item "Evolved UTRA and UTRAN". The study will investigate means of achieving major leaps in performance in order to improve service provisioning and reduce user and operator costs. It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned. More specifically, some key performance and capability targets for the long-term evolution are:

Significantly higher data rates compared to HSDPA and HSUPA: envisioned target peak data rates of more than 100 Mbps over the downlink and 50 Mbps over the uplink Improved coverage: high data rates with wide-area coverage Significantly reduced latency in the user plane in the interest of improving the performance of higher layer protocols (for example, TCP) as well as reducing the delay associated with control plane procedures (for instance, session setup); and Greater system capacity: threefold capacity compared to current standards.

Further, another key requirement of the long-term evolution is to allow for a smooth migration to these technologies.

The uplink (UL) access scheme according to the long-term evolution will be described in the following. For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4.

As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as can be seen from FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 4 may give the impression of a multi-carrier signal where each comb-finger corresponds to a "sub-carer". However, from the time-domain signal-generation of a distributed single-carrier signal, it should be clear that what is being generated is a true single-carrier signal with a corresponding low peak-to-average power ratio. The key difference between a distributed single-carrier signal vs. a multi-carrier signal, such as e.g. OFDM, is that, in the former case, each "sub-carrier" or "comb finger" does not carry a single modulation symbol. Instead each "comb-finger" carries information about all modulation symbol. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast thereto, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that in many cases the scheduling decision may decide to give the whole bandwidth to a single UE to achieve high data rates.

The uplink scheme should allow for both scheduled (Node B controlled) access and contention-based access. In case of scheduled access the UE is dynamically allocated a certain frequency resource for a certain time (i.e. a time/frequency resource) for uplink data transmission.

However, some time/frequency resources can be allocated for contention-based access. Within these time/frequency resources, UEs can transmit without first being scheduled.

For the scheduled access, the Node B scheduler assigns a user a unique frequency/time resource for uplink data transmission. More specifically, the scheduler determines which UE(s) is (are) allowed to transmit, which physical channel resources (frequency) may be used, for how long the resources may be used (number of sub-frames) and which transport format (Modulation Coding Scheme (MCS)+transport block size) is to be used by the mobile terminal for transmission.

The allocation information is signaled to the UE via a scheduling grant, sent on the downlink control channel. For simplicity reasons, this channel is called LTE_HS_SCCH in the following. A scheduling grant message contains at least information on which part of the frequency band the UE is allowed to use, whether localized or distributed spectrum should be used, the validity period of the grant, and the maximum data rate. The shortest validity period is one sub-frame. Additional information may also be included in the grant message, depending on the selected scheme.

Uplink data transmissions are only allowed to use the time-frequency resources assigned to the UE through the scheduling grant. If the UE does not have a valid grant, it is not allowed to transmit any uplink data. Unlike in HSUPA, where each UE is always allocated a dedicated channel, there is only one uplink data channel shared by multiple users (UL SCH) for data transmissions. Furthermore, there is only one mode of operation for the uplink data access in LTE, the above described scheduled access, i.e. unlike in HSUPA where both scheduled and autonomous transmissions are possible.

To request resources, the UE transmits a resource request message to the Node B. This resource request message could for example contain information on the amount of data to transmit, the power status of the UE and some Quality of Services (QoS) related information. This information, which will be referred to as scheduling information, allows Node B to make an appropriate resource allocation.

Resource requests are transmitted using the contention-based access compared to the above described scheduled access. However, if the UE already has a valid grant, e.g., if a data transmission is ongoing, the resource requests updates can be transmitted using the granted resources, e.g., as part of MAC headers or MAC control PDU. Contention-based access can be seen as a special case of the normal scheduled access, where Node B assigns a physical resource to one user. In case of contention-based access a physical resource (sub-carriers) is assigned/shared to multiple UEs for uplink transmission. The allocation for the contention-based channel, also referred to as random access channel, is for example signaled on a broadcast channel, so that all UEs in a cell have access to this area.

FIG. 5 illustrates an exemplary allocation for contention-based access. The bandwidth of the random access channel depends on the estimated number of simultaneous accessing users and on the size of the messages transmitted on the channel. In the figure the Random access channel is allocated in a TDM fashion, one out of X sub-frames is reserved for contention-based access over the entire frequency band. However, it is also possible to allocate only part of the total Bandwidth band for random access in a distributed spectrum, in order to benefit further from frequency diversity.

Since the access is not scheduled, there is a probability, that multiple UEs access the random access channel simultaneously, leading to collisions. UE-specific scrambling and processing gain can be used in order to separate the various transmissions. The contention-based access should be only used for requesting resources in case UE has no valid grant assigned or for the initial access (going from idle to connected mode).

Channel-dependent scheduling should be also supported by the uplink-scheduling scheme in LTE. However, since there is no uplink transmission from non-scheduled UEs, same is not straightforward.

Node B needs to know the users uplink channel status before allocating resources by means of a channel-dependent scheduling algorithm. Therefore it was considered that UE transmits pilot bits, which are known at the receiver side, prior to the data transmission to support channel-dependent scheduling. Node B can consider the measured C/I of the pilots bits for the resource allocation.

The Node B controlled scheduled access is based on uplink and downlink control signaling together with a specified UE behavior with respect to the control signaling.

In the downlink, a resource allocation message is transmitted from Node B to the UE indicating the physical resources (time/frequency resource) assigned to this user. As already mentioned above, this allocation message, also referred to as scheduling grant, contains information on the identification of the user the resource allocation is addressed to, the reserved physical resource (time/frequency resource), some information on the maximum data rate, modulation and coding scheme and also probably some HARQ related information (redundancy version).

In the uplink, UE sends a scheduling request to the Node B when data for uplink transmission is available in the buffer. The scheduling request message contains information on the UE status, e.g. buffer status, QoS related information, power headroom information. This in turn allows Node B to make an appropriate allocation of resources considering also QoS requirements of the data to be transmitted.

In parallel to the actual uplink data transmission, UE signals data related control signaling, providing information on the current data transmission similar to the E-DPCCH signaling in Rel6 (HSUPA). This control signaling contains information on the chosen transport format (TFCI), which is used for decoding the data transmission at Node B, and some HARQ related information, e.g. Redundancy version, HARQ process ID and NDI. The exact information depends obviously on the adopted HARQ protocol. For example in a synchronous HARQ protocol there is no need to signal the HARQ process ID explicitly.

It should be noted, that the exact scheduling procedure for uplink, e.g. order of signaling message and the detailed format of corresponding scheduling related control messages, has not been decided upon yet.

To ensure orthogonality in the uplink, all UE transmissions must be time aligned at the Node B within the cyclic prefix. This is implemented by the Node B measuring on the received signal and, based on the timing accuracy, transmitting a timing adjustment command to the UE. The timing adjustment command is sent as control information using the downlink SCCH. Note that a UE not actively transmitting may be out-of-sync, which needs to be accounted for in the initial random access. This timing control information commands UE to advance or retract the respective transmit timing. Two alternatives for the timing control commands are currently considered:

Binary timing-control commands implying forward/backward of the transmit timing a certain step size x μs [x to be determined] transmitted with a certain period y μs [y to be determined].

Multi-step timing-control commands being transmitted on the downlink on a per-need basis.

As long as a UE carries out uplink data transmission, the received signal can be used by Node B to estimate the uplink receive timing and thus as a source for the timing-control commands. When there is no data available for uplink, the UE may carry out regular uplink transmissions (uplink synchronization signals) with a certain period, to continue to enable uplink receive-timing estimation and thus retain uplink time alignment. In this way, the UE can immediately restart uplink-orthogonal data transmission without the need for a timing re-alignment phase.

If the UE does not have uplink data to transmit for a longer period, no uplink transmission should be carried out. In that case, uplink time alignment may be lost and restart of data transmission must then be preceded by an explicit timing-re-alignment phase to restore the uplink time alignment.

However, the above described scheduling and controlling schemes implicate several problems and drawbacks that will be outlined in the following. As described above, the E-DPCCH carrying control signaling related to the E-DCH is always transmitted simultaneously to the E-DPDCH. It contains information on the transport format of the current transmission (E-TFCI), which is represented by 7 bits. Since the decoding of the data channel (E-DPDCH) requires the information transmitted on the related control channel (E-DPCCH), the control information needs to be received correctly. Therefore in order to guarantee a reliable transmission, the control channel needs to be transmitted with sufficient power. Since the UE is in most cases power-limited in the uplink there is a general pursuit of reducing the amount of control signaling.

In case of HSUPA, the scheduling grant indicates the maximum power ratio, the UE is allowed to use for transmission of scheduled data. The actual used transport format, e.g. data rate, could however differ significantly from the scheduled maximum value, since E-DCH has also to compete with non-scheduled DCH traffic, which is always highest priority. Furthermore there is also non-scheduled data in HSUPA as already described above. Therefore the transport format for E-DCH transmission selected during E-TFC selection depends on the scheduling grant, other UL traffic (DCH, HS-DPCCH) and finally the power status of the UE.

This in turn makes it unavoidable, that the UE has to signal the absolute value of the used transport format (E-TFCI) of the current data transmission represented by 7 bits.

As already indicated above, also for the uplink scheme in LTE UE is required to signal the used transport format of the uplink data transmission in order to allow for correct decoding of the data packet at Node B.

SUMMARY OF THE INVENTION

The object of the invention is to propose a scheduling scheme which reduces the overhead of uplink control signaling. Another object is to propose a scheduling scheme that allows overcoming at least one of the problems outlined above.

The object is solved by the subject matter of the independent claims. Advantageous embodiments of the invention are subject matters to the dependent claims.

According to an embodiment of the invention, a method for transmitting data on uplink within a mobile communication system is provided, wherein a mobile terminal receives, from a network entity, a resource allocation message granting resources for transmitting data, said resource allocation message indicating a scheduled transport format. The mobile terminal may determine a difference between said scheduled transport format and a transmission transport format to be used for transmitting data on the granted uplink resources, and may transmit to said network entity said data together with a relative transport format indicator which is indicative of said difference between said scheduled transport format and the transmission transport format used for said data transmission on the uplink.

According to another embodiment of the present invention, the mobile terminal performs a transport format combination selection step for selecting the transport format to be used for data transmission on the uplink.

In this case, said relative transport format indicator may be transmitted as a transport format combination indicator.

In an advantageous embodiment of the present invention, said transmission transport format to be used for transmitting data on the granted uplink resources is reduced compared to said scheduled transport format, and wherein the relative transport format indicator is restricted to values indicating the same as the scheduled transport format or a reduction of transport format.

According to an advantageous variation, said mobile communication system may utilize an uplink scheme comprising transmissions on a scheduled shared channel and a contention-based channel, and, prior to receiving said resource allocation message granting resources for transmitting data via the scheduled shared channel, said mobile terminal may transmit a resource request to a network entity responsible for resource allocation via the contention-based channel.

In a further embodiment, a single carrier FDMA scheme is used to transmit data on the uplink.

Moreover, the resources for transmitting data may be granted on a transmission time interval basis.

According to a further embodiment of the present invention, the resource request comprises resource information indicating the uplink resources required by the mobile terminal for transmitting user data.

Another embodiment of the invention relates to a method for transmitting data on uplink within a mobile communication system, wherein a mobile terminal receives from a network entity, a resource allocation message granting resources for transmitting data, said resource allocation message indicating a scheduled transport format, and transmits, in response to the resource allocation message, said data to said network entity using said scheduled transport format as a transmission transport format, without transmitting to said network entity control data indicative of said transmission transport format.

In a variation of this embodiment, said mobile terminal adapts the transmission power for data transmission on uplink using the scheduled transport format, if the mobile terminal has not sufficient transmission power as required for the scheduled transport format.

In particular, said mobile terminal may transmit data with a reduced transmission power compared to a transmission power required for said scheduled transport format.

According to a further embodiment of the present invention, said mobile communication system utilizes an uplink scheme comprising transmissions on a scheduled shared channel and a contention-based channel, and the mobile terminal transmits, prior to receiving said resource allocation message granting resources for transmitting data via the scheduled shared channel, a resource request to a network entity responsible for resource allocation via the contention-based channel.

In a further embodiment, a single carrier FDMA scheme may be used to transmit data on the uplink.

According to a further embodiment of the present invention, the resources for transmitting data are granted on a transmission time interval basis.

In another variation of this embodiment, the resource request comprises resource information indicating the uplink resources required by the mobile terminal for transmitting user data.

The present invention further relates to a method for receiving data on uplink within a mobile communication system. A network entity responsible for resource allocation of the mobile communication system transmits to a mobile terminal a resource allocation message granting resources for transmitting data, said resource allocation message indicating a scheduled transport format, and receives, together with said transmission data, a relative transport format indicator, which is indicative of a difference between said scheduled transport format and a transmission transport format used for transmitting said data on the uplink.

According to a further embodiment of the present invention, said network entity allocates said scheduled transport format based on scheduling information received from said mobile terminal.

In a further variation of this embodiment, said relative transport format indicator is received as a transport format combination indicator.

According to a further embodiment of the present invention, said transmission transport format to be used for transmitting data on the granted uplink resources is reduced compared to said scheduled transport format, and wherein the relative transport format indicator is restricted to values indicating same as scheduled transport format or a reduction of transport format.

In another embodiment of the present invention, said mobile communication system utilizes an uplink scheme comprising transmissions on a scheduled shared channel and a contention-based channel, and said mobile terminal, prior to receiving said resource allocation message granting resources for transmitting data via the scheduled shared channel, transmits a resource request to a network entity responsible for resource allocation via the contention-based channel.

According to a further embodiment of the present invention, a single carrier FDMA scheme is used to transmit data on the uplink.

Optionally, the resources for transmitting data may be granted on a transmission time interval basis.

In a further embodiment of the present invention, the resource request comprises resource information indicating the uplink resources required by the mobile terminal for transmitting user data.

The present invention also relates to a method for receiving data on uplink within a mobile communication system, wherein a network entity responsible for resource allocation of the mobile communication system transmits to a mobile terminal a resource allocation message granting resources for transmitting data, said resource allocation message indicating a scheduled transport format, receives transmitted data from said mobile terminal and decodes said data utilizing said scheduled transport format, without receiving control data indicative of said transmission transport format.

According to a variation of this embodiment, said network entity receives said data with a reduced transmission power compared to a transmission power required for said scheduled transport format.

In a further embodiment, a retransmission protocol, i.e. HARQ, is adapted to compensate for a transmission power reduction, if the mobile terminal has not sufficient transmission power as required for the scheduled transport format.

According to a further embodiment of the present invention, said mobile communication system utilizes an uplink scheme comprising transmissions on a scheduled shared channel and a contention-based channel, and receives, prior to transmitting said resource allocation message granting resources for transmitting data via the scheduled shared channel, a resource request from said mobile terminal via the contention-based channel.

In a further embodiment of the invention, a single carrier FDMA scheme is used to transmit data on the uplink.

Further, the resources for transmitting data may be granted on a transmission time interval basis.

According to a further embodiment of the present invention, the received resource request comprises resource information indicating the uplink resources required by the mobile terminal for transmitting user data.

Another embodiment of the present invention relates to a mobile terminal for use in a mobile communication system, that comprises a receiver for receiving, from a network entity, a resource allocation message granting resources for transmitting data, said resource allocation message indicating a scheduled transport format, determining means for determining a difference between said scheduled transport format and a transmission transport format to be used for data transmission on the uplink, and a transmitter for transmitting to said network entity said data together with a relative transport format indicator which is indicative of said difference between said scheduled transport format and the transmission transport format used on transmission of said data on the uplink.

According to a further embodiment of the present invention, the mobile terminal may comprise means configured to implement the steps of the method for transmitting data on uplink within a mobile communication system according to one of the various embodiments outlined herein.

Another embodiment of the present invention relates to a mobile terminal for use in a mobile communication system, comprising a receiver for receiving, from a network entity, a resource allocation message granting resources for transmitting data, said resource allocation message indicating a scheduled transport format, a transmitter for transmitting, in response to the resource allocation message, said data to said network entity using said scheduled transport format as a transmission transport format, without transmitting to said network entity control data indicative of said transmission transport format.

According to a further embodiment of this variation, the mobile terminal may comprise means configured to implement the steps of the method for transmitting data on uplink within a mobile communication system according to one of the various embodiments outlined herein.

The present invention also relates to a network entity responsible for resource allocation for use in a mobile communication system. The network entity responsible for resource allocation comprises a transmitter for transmitting to a mobile terminal a resource allocation message granting resources for transmitting data, said resource allocation message indicating a scheduled transport format, a receiver for receiving, together with said transmission data, a relative transport format indicator, which is indicative of a difference between said scheduled transport format and a transmission transport format used for transmission of said data on the uplink.

In a further embodiment the network entity may comprise means configured to implement the steps of the method for allocating resources to a mobile terminal for transmitting data on uplink within a mobile communication system according to one of the various embodiments described herein.

The present invention further relates to another embodiment of a network entity responsible for resource allocation for use in a mobile communication system. The network entity responsible for resource allocation comprises a transmitter for transmitting to the mobile terminal a resource allocation message granting resources for transmitting data, said resource allocation message indicating a scheduled transport format, and a receiver for receiving transmitted data from said mobile terminal and decoding said data utilizing said scheduled transport format, without receiving control data indicative of said transmission transport format.

In a further embodiment of this variation, the network entity may comprise means configured to implement the steps of the method for allocating resources to a mobile terminal for transmitting data on uplink within a mobile communication system according to one of the various embodiments described herein.

According to another embodiment, a computer-readable medium is provided that stores instructions that, when executed by a processor of a mobile terminal, cause the mobile terminal to receive, from a network entity, a resource allocation message granting resources for transmitting data, said resource allocation message indicating a scheduled transport format, determine a difference between said scheduled transport format and a transmission transport format to be used for data transmission on uplink, and transmit to said network entity said data together with a relative transport format indicator which is indicative of said difference between said scheduled transport format and the transmission transport format used for transmission of said data on the uplink.

In a further embodiment, the computer-readable medium further stores instructions that, when executed by the processor of the mobile terminal, cause the mobile terminal to execute the method for transmitting data on uplink within a mobile communication system according to one of the various embodiments outlined herein.

According to another embodiment, a computer-readable medium is provided that stores instructions that, when executed by a processor of a mobile terminal, cause the mobile terminal to receive, from a network entity, a resource allocation message granting resources for transmitting data, said resource allocation message indicating a scheduled transport format, and to transmit, in response to the resource allocation message, said data to said network entity using said scheduled transport format as a transmission transport format, without transmitting to said network entity control data indicative of said transmission transport format.

In a further embodiment of this variation, the computer-readable medium further stores instructions that, when executed by the processor of the mobile terminal, cause the mobile terminal to execute the method for transmitting data on uplink within a mobile communication system according to one of the various embodiments outlined herein.

The present invention also relates to providing a computer-readable medium storing instructions that, when executed by a processor of a network entity responsible for resource allocation, cause the network entity responsible for resource allocation to transmit to a mobile terminal a resource allocation message granting resources for transmitting data, said resource allocation message indicating a scheduled transport format, and to receive, together with said transmission data, a relative transport format indicator, which is indicative of a difference between said scheduled transport format and a transmission transport format used for transmission of said data on the uplink.

In a further embodiment, the computer-readable medium further stores instructions that, when executed by the processor of the network entity responsible for resource allocation, cause the network entity responsible for resource allocation to execute the steps of the method according to one of the various embodiments outlined herein.

According to another embodiment, a computer-readable medium is provided that stores instructions that, when executed by a processor of a network entity responsible for resource allocation, cause the network entity responsible for resource allocation to transmit to a mobile terminal a resource allocation message granting resources for transmitting data, said resource allocation message indicating a scheduled transport format, and to receive transmitted data from said mobile terminal and decode said data utilizing said scheduled transport format, without receiving control data indicative of said transmission transport format.

In a further embodiment of this variation, the computer-readable medium further stores instructions that, when executed by the processor of the network entity responsible for resource allocation, cause the network entity responsible for resource allocation to execute the steps of the method according to one of the various embodiments outlined herein.

BRIEF DESCRIPTION OF THE FIGURES

In the following the invention is described in more detail in reference to the attached figures and drawings. Similar or corresponding details in the figures are marked with the same reference numerals.

FIG. 3 shows a exemplary localized allocation of the uplink bandwidth in a single carrier FDMA scheme, FIG. 4 shows a exemplary distributed allocation of the uplink bandwidth in a single carrier FDMA scheme, FIG. 5 a schematic diagram of resource allocation for contention-based access.

DETAILED DESCRIPTION OF THE INVENTION

Figure 1:
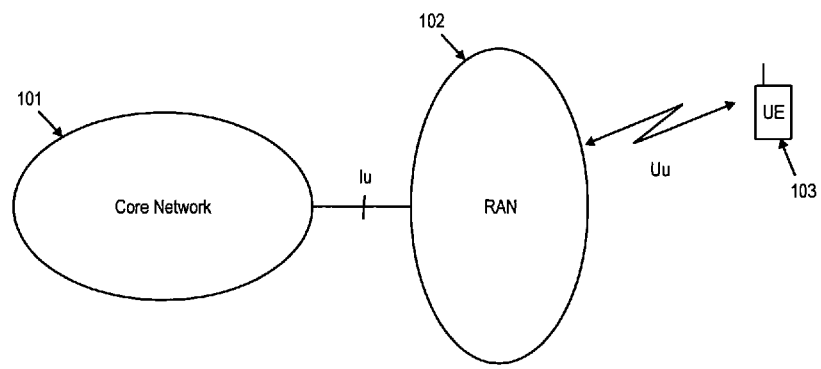
FIG. 1 shows an exemplary network architecture, in which the invention may be utilized.
Figure 5:
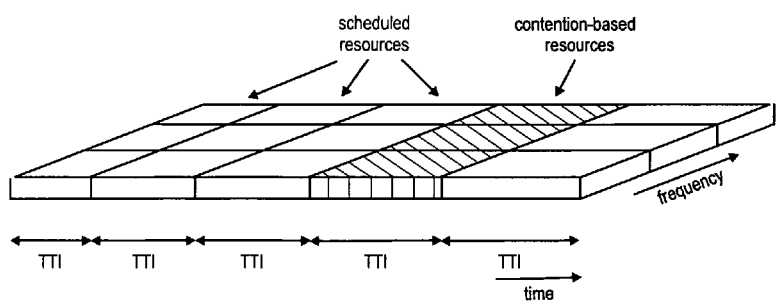

The present invention proposes a method which achieves a significant reduction of the uplink (UL) control signaling overhead by considering characteristics of an orthogonal radio access scheme used for LTE UL and using differential signaling of the transport format information. The main idea of the invention is to use a differential signaling of the transport format indicator relative to the scheduled transport format for the evolved UTRA uplink transmission scheme instead of signaling the absolute transport format as done for example in Rel6.

As already mentioned, there is a general pursuit of minimizing the control-signaling overhead for uplink transmissions. The motivation for this lies in the significant consumption in terms of transmit power for control signaling, in order to guarantee a reliable transmission. Furthermore, UL control signaling steals resources, which could be used otherwise for transmission of data. Finally any reduction in the amount of control signaling will benefit the coverage, especially at the short sub-frame/TTI duration (0.5 ms) which is considered for evolved UTRA.

Single-carrier transmission combined with FDMA, also referred to as SC-FDMA, with dynamic bandwidth allocation has been chosen as the evolved UTRA uplink transmission scheme. Efficient scheduling in an orthogonal uplink radio access requires Node B to rapidly allocate resources, e.g. frequency/time symbols, among UEs having data for transmission thereby meeting the QoS requirements of the corresponding data.

In contrast to Rel6 HSUPA, Node B schedules every UL data transmission; there is no unpredicted non-scheduled data traffic like DCH channels foreseen for the evolved UTRA uplink transmission scheme. Every data flow is transmitted on the uplink-shared channel (UL-SCH) controlled by Node B. UE provides Node B with information on its status, e.g. buffer status, QoS information and power status. This scheduling information needs to be very detailed in order to enable Node B to make an appropriate resource allocation and transport format selection. It's expected, that the size of the scheduling information provided to Node B is much larger compared to Rel6 HSUPA, where only 18 bits are used.

Furthermore, the support of channel-dependent scheduling by the evolved UTRA uplink scheme is another feature, which takes the precise knowledge of the UE status in Node B for granted. It follows from this observation, that the used transport format for uplink data transmission selected in TFC selection will not differ much from the transport format indicated in the scheduling grant. Due to power problems, e.g. caused by degrading channel quality, UE might not always be able to transmit with the scheduled transport format. It should be kept in mind, that there is a delay between the time instance of reporting the Scheduling Information and the time instance when UE is actually transmitting data according to the scheduling grant determined based on the scheduling information. But in general the cases where UE cannot transmit with the scheduled transport format due to power limitations should occur fairly seldom.

The present invention takes advantage of the observations made above by introducing a differential signaling of the transport format indicator. A relative Transport Format Combination Indicator (TFCI) is used to indicate the difference from the granted transport format. An example of the proposed control signaling is illustrated in the Table 2 below. It should be noted, that the number of bits representing the TFCI could be also different from 2 bits used in the example.

TABLE 2

Example for relative Transport Format Indicators

| Transport Format Combination Indicator (TFCI) | Meaning |
|---|---|
| 00 | $TFC_{grant}$ |
| 01 | $TFC_{grant}-1$ |
| 10 | $TFC_{grant}-2$ |
| 11 | $TFC_{grant}-3$ |

In Table 2, TFCI represents the transport format information transmitted simultaneously to the UL data transmission, e.g. UL control signaling. $TFC_{grant}$ denotes the granted transport format. In this example 2 bits represent the TFCI. It' important to note that UE is not allowed to transmit with a higher transport format than indicated in the scheduling grant.

By introducing the proposed method, the control signaling overhead can be greatly reduced, e.g. by 70% compared to Rel6 in the given example. The saved resources could be spent for data transmission, thereby increasing the throughput.

As an alternative to the proposed method of using differential TFCI signaling, the UE could be always obliged to use exactly the transport format as indicated in the scheduling grant. This embodiment may render the need for signaling information on the used transport format superfluous, and may ensure that Node B perfectly knows the transport format of the upcoming transmission.

Furthermore, the selection of the transport format in the UE, which is also referred to as TFC selection, will be quite simplified with this approach. Basically UE could just simply take the indicated transport format and fill it with data pending for transmission. In case the amount of data in the UE buffer is not sufficient to fill up the assigned uplink resources with the scheduled transport format, padding should be used to fill the granted resources. In Rel6 TFC selection is one of the most complex procedures UE has to perform.

However, there are still situations where UE is not able to transmit the required transport format due to power problems. Generally, every transport format is assigned a certain transmission power in order to meet the block error rate requirements. In situations where UE has not sufficient power required for the transmission of a transport format, the UE behavior has to be defined.

UE shall always use the transport format for uplink transmissions as indicated in the scheduling grant. In situations where UE has not sufficient transmission power required for the scheduled transport format, the data transmission should be done with reduced power. The HARQ protocol will compensate in such case for the reduced reliability due to the power reduction.

In one embodiment, the invention is used in a mobile communication system in which single carrier FDMA is used on the air interface for uplink transmission. In this exemplary embodiment, the basic physical resource used for data transmission consists of a frequency resource of size $BW_{grant}$ during one transmission time interval, e.g. a sub-frame, onto which (optionally coded) user data bits are mapped. It should be noted that a sub-frame, also referred to as transmission time interval (TTI), is the smallest time interval for user data transmission. It is, however, possible to assign a frequency resource $BW_{grant}$ over a longer time period than one TTI to a user by concatenation of sub-frames. In this respect, FIG. 3 and FIG. 4 illustrate an exemplary allocation of uplink resources to a mobile terminal within a single carrier FDMA system.

A scheduled shared channel according to the invention is—for example—either a shared transport channel, which is shared by a plurality of users, or the corresponding physical channel to which a shared transport channel is mapped.

In an exemplary embodiment related to the evolved UTRA uplink, there exists only a shared uplink transport channel (UL-SCH) and a Random Access Channel (RACH). Transmission on a scheduled shared channel in this embodiment means that a user is assigned a specific frequency/time resource for the transmission of uplink data. The assignment is done by a scheduler that schedules/allocates the bandwidth available for scheduled access among the users under its control. A contention-based channel according to this embodiment denotes either the Random Access Channel (RACH), which is a transport channel, or the corresponding physical channel. Transmission on a contention-based channel means that a user can transmit data on the contention-based resources without being scheduled.

Before discussing the different embodiments of the invention in more detail, exemplary network architectures, in which the invention may be employed, will be briefly described in the following. It should be noted that the two network architectures are merely intended to give examples of networks in which the invention may be used and are not intended to limit the invention to the use in these networks.

One exemplary mobile communication network in which the invention in its different embodiments may be implemented is depicted in FIG. 1. The network comprises different network entities that are functionally grouped into the Core Network (CN) 101, the Radio Access Network (RAN) 102 and the User Equipments (UEs) 103 or mobile terminals. The RAN 102 is responsible for handling all radio-related functionality inter alia including scheduling of radio resources. The CN 101 may be responsible for routing calls and data connections to external networks. The interconnections of network elements are defined by open interfaces that are denoted Iu and Uu for exemplary purposes. A mobile communication system is typically modular and it is therefore possible to have several network entities of the same type.

In this exemplary network illustrated in FIG. 1, the radio access network may comprise one or more network entities responsible for resource allocation. Assuming that FIG. 1 shows a high-level architecture of 3G networks, a network entity responsible for resource allocation is commonly referred to as the radio network controller (RNC) which schedules air interface resources within the cells of the Node Bs attached to the RNC. Alternatively, other implementations may also foresee to utilize other RAN entities, such as the base stations (NodeBs) to schedule/allocate air interface resources.

Figure 2:
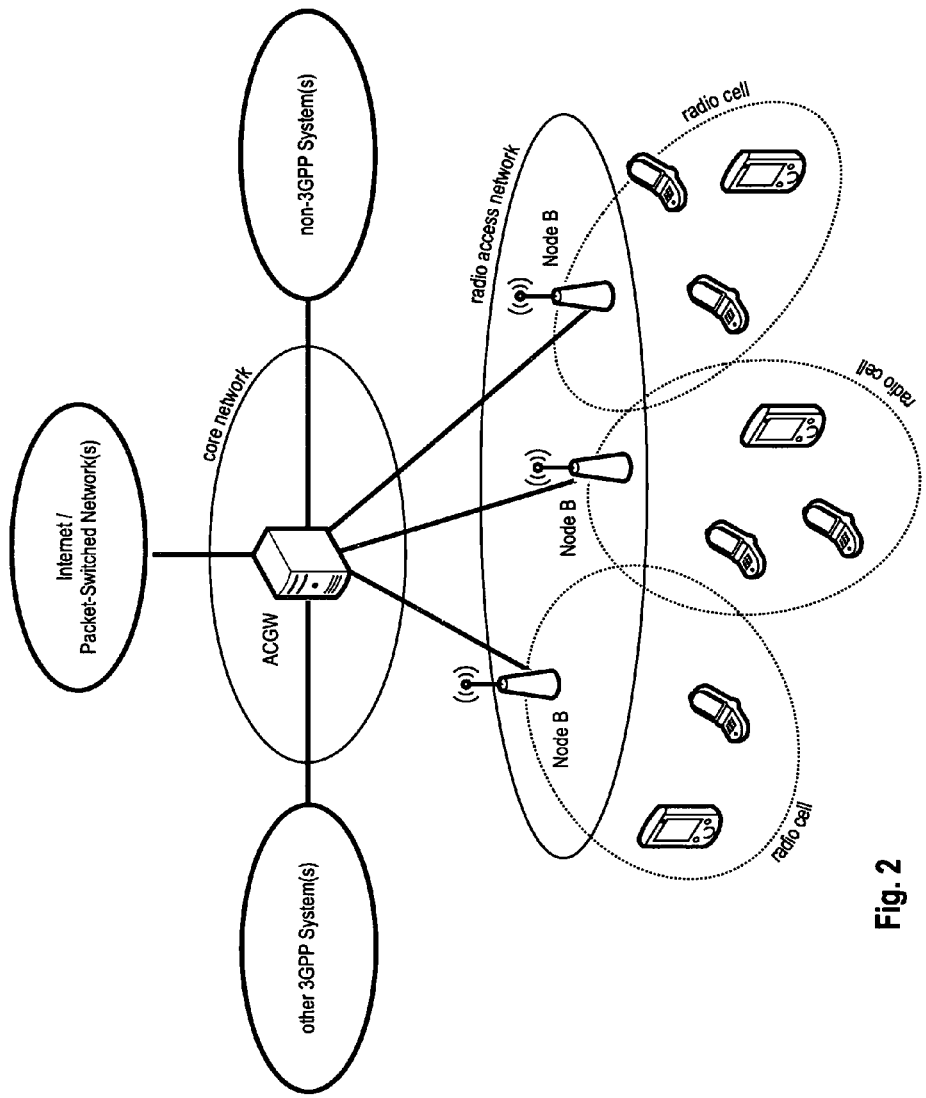
FIG. 2 shows another exemplary network architecture, in which the invention may be utilized.

Another exemplary network architecture is shown in FIG. 2. The mobile communication system according to the exemplary embodiment shown in FIG. 2 is a "two node architecture" consisting of Access and Core Gateways (ACGW) and Node Bs. In comparison to the network architecture shown in FIG. 1, the ACGW will handle CN functions, i.e. routing calls and data connections to external networks, and also implements RAN functions. Thus, the ACGW may be considered as to combine functions performed by GGSN and SGSN in today's 3G networks and RAN functions as for example radio resource control (RRC), header compression, ciphering/integrity protection and outer ARQ. The Node Bs may handle functions as for example segmentation/concatenation, scheduling and allocation of resources, multiplexing and physical layer functions.

The control plane (CP) and user plane (UP) known from today's 3G networks may be terminated in the ACGW, which would enable support of seamless network controlled mobility without the need for interfaces between the Node Bs. Both 3GPP and Non-3GPP integration may be handled via the ACGW's the interface to the external packet data networks (e.g. Internet).

As already indicated above, in the exemplary network architecture of FIG. 2, it is assumed that the ownership of the cell resources is handled in each Node B. Having the cell resource ownership outside the ACGW makes it possible to support pooling of ACGW (of both CP/UP flows), allowing one Node B to be connected to several ACGWs for different terminals (thus avoiding a single point of failure).

Although not directly shown in FIG. 1 it is also possible to support an inter-ACGW interface for the case of ACGW belonging to different pools.

Next, different embodiments of the invention will be described in more detail. It is to be noted that in FIGS. 6 and 7, a base station (Node B) is assumed to be the network entity in the mobile communication system responsible for resource allocation for exemplary purposes. The function within a network entity in the mobile communication system responsible for resource allocation for planning and allocating resources to the mobile terminals is also referred to as the scheduler.

Figure 6:
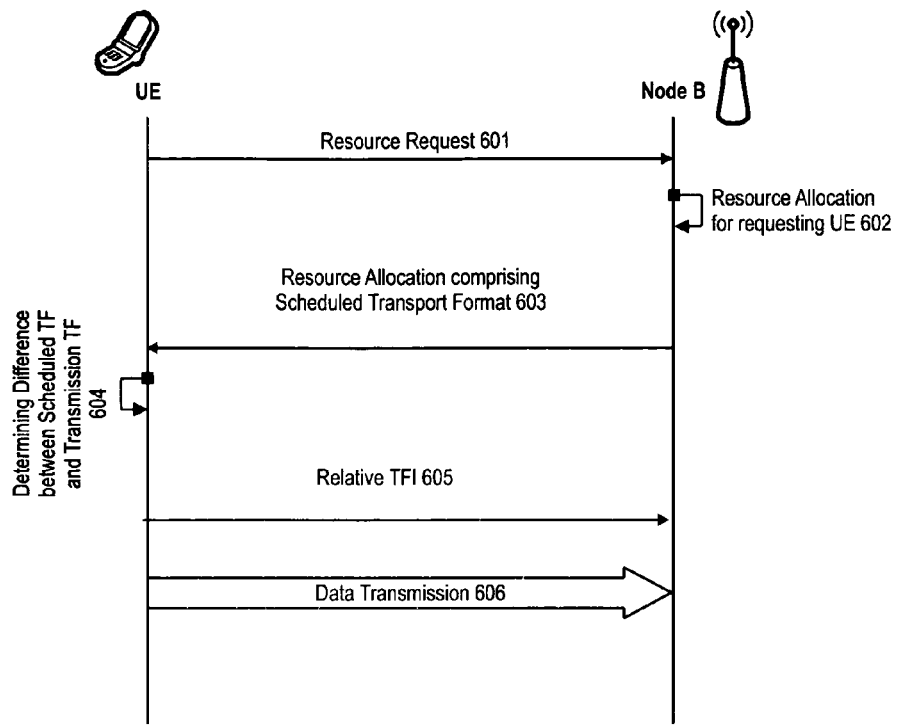
FIG. 6 shows an exemplary embodiment of a resource allocation and uplink data transmission procedure according to a first embodiment of the invention.

FIG. 6 illustrates a resource allocation and uplink data transmission procedure according to one exemplary embodiment of the invention.

In the first step, a mobile terminal (UE) sends 601 a resource request to the base station (Node B) in order to request the allocation of uplink resources for the transmission of data. For example, the mobile terminal will typically send this message when user data arrives in a transmission buffer at the mobile terminal. In FIG. 6, it is assumed that the mobile terminal hasn't been allocated any resources yet, so that no scheduled resources have been allocated to the mobile station. The resource request message is transmitted on a contention-based channel. For example, but not limited thereto, the resource request is a Layer-1 or Layer 2 message.

Upon reception of the resource request at the base station, the base station issues 602 and transmits 603 a resource allocation message to the mobile terminal. According to the present invention, the resource allocation message indicates a granted scheduled transport format.

In response to this information, the UE determines 604 a difference between the scheduled transport format and a transport format it intends to use for transmitting data on the granted uplink resources. The transport format, which UE is going to use for the uplink data transmission, is determined by the result of the transport format combination selection (TFC) procedure. Usually the UE has to perform TFC selection for every initial transmission. Together with the transmitted data (606), according to the present invention, the UE transmits 605 a relative transport format indicator to Node B which is indicative of the difference between the scheduled transport format and the actual transport format used for the data transmission 606.

The exemplary resource allocation procedure described with respect to FIG. 6 above may have several advantages. In particular, the proposed method achieves a significant reduction of the UL control signaling overhead by considering characteristics of an orthogonal radio access scheme used for evolved UTRA uplink scheme and using differential signaling of the transport format information. Although the invention is particularly suitable for uplink transmissions in an orthogonal single-carrier radio access scheme, it is not restricted to this particular embodiment.

Figure 7:
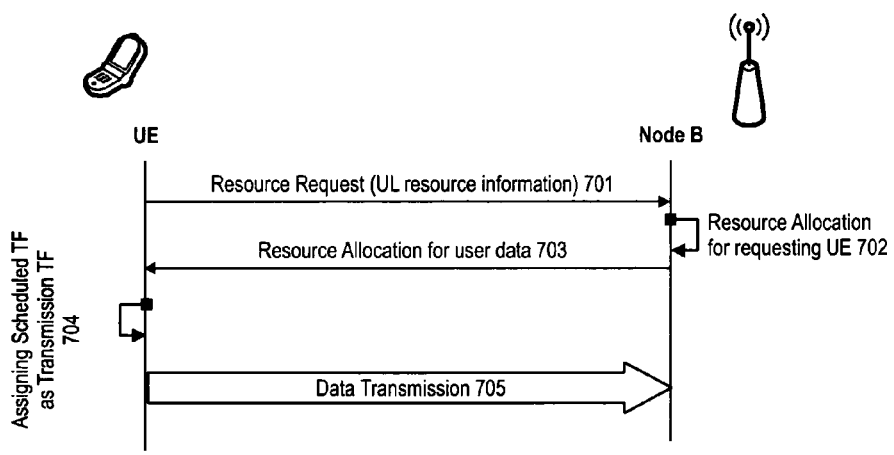
FIG. 7 shows an exemplary embodiment of a resource allocation and uplink data transmission procedure according to another embodiment of the invention.

Next, another exemplary embodiment of a resource allocation procedure will be described with reference to FIG. 7. The mobile terminal first sends 701 a resource request to the base station. As already described with reference to FIG. 6, upon reception of the resource request at the base station, the base station issues 702 and transmits 703 a resource allocation message to the mobile terminal. According to the present invention, the resource allocation message indicates a granted scheduled transport format.

In contrast to the embodiment shown in FIG. 6, the UE directly uses the scheduled transport format for the data transmission 705 to Node B. By using exactly the transport format as indicated in the scheduling grant, the need for signaling information on the used transport format does no longer exist.

Another embodiment of the invention relates to the implementation of the above described various embodiments using hardware and software. It is recognized that the various embodiments of the invention above may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for transmitting data on uplink within a mobile communication system comprising a base station and a mobile terminal, the method comprising the following steps performed by the mobile terminal:

receiving, from said base station, a resource allocation message granting uplink resources for transmitting data, said resource allocation message comprising an indication of a scheduled transport format, and transmitting, in response to the resource allocation message, said data to said base station using said scheduled transport format, wherein:

the step of transmitting is carried out without transmitting to said base station control information indicative of said scheduled transport format, and said mobile terminal adopts a transmission power for data transmission on the uplink using the scheduled transport format, if a transmission power required for the scheduled transport format exceeds a maximum power the mobile terminal can transmit with.

2. The method according to claim 1, wherein said mobile communication system utilizes an uplink scheme comprising transmissions on a scheduled shared channel and a contention-based channel, and wherein,
 prior to receiving said resource allocation message granting uplink resources for transmitting data via the scheduled shared channel, said mobile terminal performs the step of:
 transmitting a resource request to a base station responsible for resource allocation via the contention-based channel.

3. The method according to claim 2, wherein a single carrier FDMA scheme is used to transmit the data on the uplink.

4. The method according to claim 2, wherein the resource request comprises resource information indicating uplink resources required by the mobile terminal for transmitting user data.

5. The method according to claim 1, wherein the uplink resources for transmitting data are granted on a transmission time interval basis.

6. The method according to claim 1, wherein, in case that an amount of data in a buffer of the mobile terminal is not sufficient to fill up the granted uplink resources with the scheduled transport format, padding is used to fill the granted uplink resources.

7. The method according to claim 1, wherein an operation wherein the mobile terminal adopts the transmission power for data transmission on uplink includes comparing the maximum power with the required power and if the required power is greater than the maximum power, the mobile terminal transmits with the maximum power and if the required power is less than the maximum power, the mobile terminal transmits at the required power.

8. A method for transmitting data on uplink within a mobile communication system comprising a base station and a mobile terminal, the method comprising the following steps performed by the mobile terminal:
 receiving, from said base station, a resource allocation message granting uplink resources for transmitting data, said resource allocation message comprising an indication of a scheduled transport format, and
 transmitting, in response to the resource allocation message, said data to said base station using said transport format, wherein:
 the step of transmitting is carried out without transmitting to said base station control information indicative of said scheduled transport format, and
 said mobile terminal transmits data with a reduced transmission power compared to a required transmission power according to said scheduled transport format, if the transmission power required for the scheduled transport format exceeds a maximum power the mobile terminal can transmit with.

9. A method for data communications on uplink within a mobile communication system comprising a base station and a mobile terminal, the method comprising the following steps:
 transmitting to the mobile terminal a resource allocation message granting resources for transmitting data by said base station responsible for resource allocation of the mobile communication system, said resource allocation message indicating a scheduled transport format, and
 receiving transmitted data from said mobile terminal and decoding said data utilizing said scheduled transport format by said base station responsible for resource allocation of the mobile communication system,
 wherein the step of receiving is carried out without receiving control information indicative of said scheduled transport format, and
 said mobile terminal adopts a transmission power for data transmission on the uplink using the scheduled transport format, if a transmission power required for the scheduled transport format exceeds a maximum power the mobile terminal can transmit with.

10. The method according to claim 9, wherein said base station receives said data with a reduced transmission power compared to the required transmission power according to said scheduled transport format.

11. The method according to claim 10, wherein an HARQ protocol is configured to compensate for a transmission power reduction, if the mobile terminal does not have sufficient transmission power as required according to the scheduled transport format.

12. The method according to claim 9, wherein said mobile communication system utilizes an uplink scheme comprising transmissions on a scheduled shared channel and a contention-based channel, and wherein,
 prior to transmitting said resource allocation message granting resources for transmitting data via the scheduled shared channel, said base station performs the step of:
 receiving a resource request from said mobile terminal via the contention-based channel.

13. The method according to claim 12, wherein a single carrier FDMA scheme is used to transmit the data on the uplink.

14. The method according to claim 12, wherein the received resource request comprises resource information indicating the uplink resources required by the mobile terminal for transmitting user data.

15. The method according to claim 9, wherein the uplink resources for transmitting data are granted on a transmission time interval basis.

16. The method according to claim 9, wherein, in case that an amount of data in a buffer of the mobile terminal is not sufficient to fill up the granted uplink resources with the scheduled transport format, padding is used to fill the granted uplink resources.

17. The method according to claim 9, wherein an operation wherein the mobile terminal adopts the transmission power for data transmission on uplink includes comparing the maximum power with the required power and if the required power is greater than the maximum power, the mobile terminal transmits with the maximum power and if the required power is less than the maximum power, the mobile terminal transmits at the required power.

18. A mobile terminal for use in a mobile communication system, the mobile terminal comprising:
 a receiver configured to receive, from a base station, a resource allocation message granting uplink resources for transmitting data, said resource allocation message comprising an indication of a scheduled transport format, and
 a transmitter configured to transmit, in response to the resource allocation message, said data to said base station using said scheduled transport format, wherein:

the transmitter is configured to transmit said data without transmitting to said base station control information indicative of said scheduled transport format, and said mobile terminal adopts a transmission power for data transmission on the uplink using the scheduled transport format if a transmission power required for the scheduled transport format exceeds a maximum power the mobile terminal can transmit with.

19. The method according to claim 18, wherein an operation wherein the mobile terminal adopts the transmission power for data transmission on uplink includes comparing the maximum power with the required power and if the required power is greater than the maximum power, the mobile terminal transmits with the maximum power and if the required power is less than the maximum power, the mobile terminal transmits at the required power.

20. A mobile terminal for use in a mobile communication system, the mobile terminal comprising:

a receiver configured to receive, from a base station, a resource allocation message granting uplink resources for transmitting data, said resource allocation message comprising an indication of a scheduled transport format; and a transmitter configured to transmit, in response to the resource allocation message, said data to said base station using said scheduled transport format, wherein:

the transmitter is configured to transmit said data without transmitting to said base station control information indicative of said scheduled transport format, and said mobile terminal is configured to transmit said data with a reduced transmission power compared to a required transmission power according to said scheduled transport format, if the transmission power required for the scheduled transport format exceeds a maximum power the mobile terminal can transmit with.

21. A mobile terminal for use in a mobile communication system, the mobile terminal comprising:

a receiver configured to receive, from a base station, a resource allocation message granting uplink resources for transmitting data, said resource allocation message comprising an indication of a scheduled transport format; and a transmitter configured to transmit, in response to the resource allocation message, said data to said base station using said scheduled transport format, wherein:

the transmitter is configured to transmit said data without transmitting to said base station control information indicative of said scheduled transport format, and said mobile terminal is configured to transmit said data with a maximum power the mobile terminal can transmit with, if a transmission power required for the scheduled transport format exceeds the maximum power the mobile terminal can transmit with.

22. A method for transmitting data on uplink within a mobile communication system comprising a base station and a mobile tell uinal, the method comprising the following steps performed by the mobile terminal:

receiving, from said base station, a resource allocation message granting uplink resources for transmitting data, said resource allocation message comprising an indication of a scheduled transport format, and transmitting, in response to the resource allocation message, said data to said base station using said scheduled transport format, wherein:

the step of transmitting is carried out without transmitting to said base station control information indicative of said scheduled transport format, and said mobile terminal transmits said data with a maximum power the mobile terminal can transmit with, if a transmission power required for the scheduled transport format exceeds the maximum power the mobile terminal can transmit with.

* * * * *